(12) United States Patent
Kubota et al.

(10) Patent No.: US 6,475,062 B1
(45) Date of Patent: Nov. 5, 2002

(54) FILM THICKNESS MEASURING METHOD, POLISHING METHOD, FABRICATION METHOD OF THIN FILM MAGNETIC HEAD AND SUBSTRATE FOR FORMING THE THIN FILM MAGNETIC HEAD

(75) Inventors: Toshio Kubota, Tokyo (JP); Masumi Sugawara, Tokyo (JP); Takehiro Horinaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/459,653

(22) Filed: Dec. 13, 1999

(30) Foreign Application Priority Data

Dec. 28, 1998 (JP) ............................................. 10-372214

(51) Int. Cl.$^7$ ................................................ B24B 49/00
(52) U.S. Cl. .................................. 451/5; 451/6; 451/11; 451/41; 356/503
(58) Field of Search ............................ 451/41, 5, 8, 10, 451/11, 6; 356/503

(56) References Cited

U.S. PATENT DOCUMENTS 5,658,183 A * 8/1977 Sandhu et al. .................. 451/5
4,959,705 A * 9/1990 Lemnios et al. ............. 257/276
5,427,973 A * 6/1995 Satoh et al. .................. 438/155
5,730,642 A * 3/1998 Sandhu et al. .................. 451/2
6,074,287 A * 6/2000 Miyaji et al. ................. 451/287
6,102,775 A * 8/2000 Ushio et al. ................... 451/41
6,142,855 A * 11/2000 Nyui et al. .................. 356/630

* cited by examiner

Primary Examiner—M. Rachuba
(74) Attorney, Agent, or Firm—Oliff & Berridge PLC

(57) ABSTRACT

The present invention relates to a film thickness measuring method measuring a film thickness of an element formation layer formed on a substrate and its object is to provide a film thickness measuring method which can measure a residual film thickness of a polishing object film in a polishing process at a high accuracy. In a fabrication method of a thin film magnetic head, alumina is coated over a dummy layer 54 and a bottom shielding layer 16 after forming the dummy layer 54 along with the bottom shielding layer 16 and a planarized layer 24 is formed by polishing the surface thereof using a CMP. Next, after forming a top shielding layer 32 over the bottom shielding layer 16, a planarized layer 38 is form by embedding alumina. A film thickness of an embedded 38 on the dummy layer 54 is measured by a non-contact optical film thickness measuring equipment and a film thickness of the top shielding layer 32 is measured based on the film thickness.

18 Claims, 8 Drawing Sheets

(a)          (b)

FILM THICKNESS MEASURING METHOD, POLISHING METHOD, FABRICATION METHOD OF THIN FILM MAGNETIC HEAD AND SUBSTRATE FOR FORMING THE THIN FILM MAGNETIC HEAD

BACKGROUND OF THE INVENTION

1. Field of the Invention

The present invention relates to a film thickness measuring method measuring a film thickness of an element formation film formed on a substrate, a fabrication method of a thin film magnetic head having a planarization process for polishing and planarizing a surface of material to be polished and a substrate for forming a thin film magnetic head which forms a plurality of elements structuring the thin film magnetic head.

2. Description of the Related Art

In a fabrication of a thin film magnetic head used as a head for writing/reading of a magnetic disk drive, a chemical mechanical polishing (hereinafter, referred to a CMP) is used when a surface having a high flatness is formed. In the CMP, first, a polishing surface of a polishing pad covered on the rotating polishing surface plate and a surface to be polished of a substrate which is a material to be polished held on a polishing head are contacted with pressure. Then, supplying slurry, which is an abrasive material, on the polishing surface of the polishing pad, and respectively rotating the polishing pad and the polishing head, the slurry is supplied between the polishing pad and the surface to be polished, thereby polishing the surface to be polished chemically and mechanically. By this polishing using the CMP, a desired global flatness can be obtained along with a local flatness.

In the meantime, in a planarization process by a surface polishing using this CMP, it is extremely important, in a point to decide a performance of the completed elements, to control the polishing so that a polishing object film after polishing has a predetermined residual film thickness. Therefore, how to be able to measure the residual film thickness of the polishing object film at a high accuracy is a subject for a planarization process of the CMP.

In the past, a non-contact and contact film thickness measuring equipments have been used for the measurement of the residual film thickness of the polishing object film. As the non-contact film thickness measuring equipments, an optical film thickness measuring equipment named Nano-Spec (product name: made by Nanometrics Japan), for example, exists. This non-contact optical film thickness measuring equipment inputs light to the film to be measured and then measures the film thickness of the film to be measured based on interference between a light reflected on the surface of the film to be measured and a light which transmits through the film to be measured and is reflected on the surface of a lower layer.

FIG. 10 shows a measuring method of the residual film thickness using the above non-contact optical film thickness measuring equipment in a process in the midst of a fabrication process of the thin film magnetic head. FIG. 10(a) shows a rough state viewing an element 101 formed on the substrate from the top of the substrate. FIG. 10(b) shows a cross section cut by a line A—A in FIG. 10(a). First, a structure of the element 101 in the midst of the formation illustrated is briefly described. A bottom shielding layer 104 which is made of permalloy (NiFe), for example, and planarized by using the CMP is formed on an AlTiC substrate 102. Though a description is omitted, an MR reading element and an insulating layer sandwiching the MR reading element are formed on the bottom shielding layer 104. Then, a top shielding layer (a bottom pole: a bottom magnetic pole) 106 is formed by laminating and patterning permalloy on this insulating layer. Further, after embedding and coating the top shielding layer with alumina, a planarization is performed using the CMP. Then, a planarized layer made of the top shielding layer 106 and embedded layers 108 and 108' is formed.

In the meantime, a method for measuring the film thickness of the top shielding layer 106 formed as above by the non-contact optical film thickness measuring equipment is briefly described. A light beam formed by setting down a spot diameter 110 to approximately 20 μm is irradiated to the embedded layer 108 from this film thickness measuring equipment. A part of the light beam is reflected on the surface of alumina of the embedded layer 108' and the rest of the light transmits through the transparent alumina and is reflected on the surface of the bottom shielding layer 104. The film thickness measuring equipment measures a film thickness of the embedded layer 108' by receiving and making these both reflection lights interfere. Since the upper surface of the bottom shielding layer 104 is planarized by the CMP and the top shielding layer 106 and the embedded layers 108 and 108' are planarized by the CMP as well, the film thickness of the embedded layer 108' shows the film thickness of the top shielding layer 106. It will be noted that the film thickness of the insulating layer on the bottom shielding layer 104 is extremely so thin that the film thickness of the insulating layer on the bottom shielding layer 104 can be neglected or can be of course obtained as the top shielding layer 106 by reducing the known film thickness of the insulating layer from the measured value.

Thus, in the conventional film thickness measurement, the measurement is performed by irradiating the light beam of the non-contact optical film thickness measuring equipment on the surface in the element area during the formation. However, the recording density of the recent magnetic recording device is more and more improved, and finer and more complicated elements structuring the thin film magnetic head are further progressed along with this improvement. Therefore, it becomes more difficult to find a preferable position for the measurement on the element. In some case, the spot diameter 110 of the non-contact optical film thickness measuring equipment can not be fully entered in the irradiation area of the surface of the element during the formation. A portion of the light beam goes beyond the measurement area, thereby leading to a problem that the enough irradiation for the measurement is more difficult. As described above, the spot diameter 110 of the light beam described in FIG. 10 is currently equal to approximately 20 μm. On the other hand, a dimension W3 of the embedded layer 108' in the measurement area shown in FIG. 10 is proceeded to be fined under 20 μm. If the current spot diameter is further reduced to accept the request of finer elements, a time is consumed for a positional confirmation before the measurement in the relationship with a measurement positioning accuracy, so that the reduction of the spot diameter is undesirable in mass-production because consequently a time required for the measurement becomes longer. If this problem is to be solved, the technical and cost burden for the film thickness measuring equipment increases, thereby leading to a higher cost of the thin film magnetic head.

Thus, in the conventional film thickness measuring method, a problem that the measurement of the residual film thickness in the polishing process such as the CMP becomes difficult accompanying to the finer and more complicated elements. Further, the difficulty of the film thickness measurement gives an influence on the mass-productivity of the elements. The more the difficulty of the film thickness measurement increases, the more a reduction of a yield in element fabrication is created. Furthermore, a throughput of the element fabrication is reduced because the time required for the film thickness measurement increases in the fabrication process, thereby leading to a possibility to create the quantity reduction of product supply.

SUMMARY OF THE INVENTION

An object of the present invention is to provide a film thickness measuring method which can measure a residual film thickness of a polishing object film in a polishing process at a high accuracy.

Another object of the present invention is to provide a film thickness measuring method which can measure a film thickness at a high accuracy even if a measurement area of the residual film thickness of the polishing object film in the polishing process is fined.

Further object of the present invention is to provide a polishing method and a fabrication method of a thin film magnetic head which improve a yield of a element fabrication by measuring a residual film thickness of a polishing object film in a polishing process at a high accuracy.

Furthermore object of the present invention is to provide a substrate for forming a thin film magnetic head which can form a plurality of elements, which structures a thin film magnetic head by the fabrication method of the above thin film magnetic head, at a high accuracy.

The above objects are achieved by a method of measuring a film thickness comprising the steps of forming, on the substrate, an element formation layer structuring a portion of an element and at least one dummy layer for a film thickness measurement which has a predetermined film thickness thinner than the element formation film and does not contribute to the structure of the element, forming a planarized layer planarized by polishing a surface until the surface of the element formation layer exposes from a embedded layer, after embedding and coating the element formation layer and the dummy layer with a predetermined embedding material, measuring a film thickness of the embedded layer over the dummy layer, and measuring a film thickness of the element formation layer based on the film thickness of the embedded layer. Further, in a film thickness measuring method in the present invention, the dummy layer is simultaneously formed with an alignment mark for an alignment on the substrate when the alignment mark is formed. Further, the dummy layer is made of a material which reflects light on the surface thereof. Further, the material is metal.

Further, the above objects are achieved by a method of measuring a film thickness comprising the steps of forming, on a surface, a first element formation layer structuring a portion of an element and at least one dummy layer which does not contributes to the structure of the element, forming a first planarized layer planarized by polishing a surface until a surface of the first element formation layer and the surface of the dummy layer expose after embedding and coating the first element formation layer and the dummy layer, forming a second element formation layer structuring a portion of the element on the first planarized layer; forming a second planarized layer planarized by polishing a surface until the surface of the second element formation layer exposes from the embedded layer after embedding and coating the second element formation layer with a predetermined embedding material, measuring a film thickness of the embedded layer on the dummy layer, and measuring a film thickness of the second element formation layer based on the film thickness of the embedded layer.

In a film thickness measuring method of the present invention, the first element formation layer and the dummy layer are simultaneously formed in the same process. Further, in a film thickness measuring method of the present invention, a plurality of the dummy layers are provided on a reference layer of a film thickness measurement according to the number of layers the thickness of which are measured. Further, in a film thickness measuring method of the present invention, at least one second dummy layer is formed when the second element formation layer is formed. Further, in a film thickness measuring method of the present invention, the second element formation layer and the second dummy layer are simultaneously formed in the same process.

In a film thickness measuring method of the present invention described above, the second dummy layer is laminated over the dummy layer of the first planarized layer. Further, the planarized layer is formed by polishing a surface using a chemical mechanical polishing.

Further, in a film thickness measuring method of the present invention, an area of the upper surface of the dummy layer is formed to be larger than one portion of an area of the element structured at the element formation layer. Then, in a film thickness measuring method of the present invention described above, the film thickness of the embedded layer is measured based on interference between a light reflected on the surface of the embedded layer when inputting a light to the embedded layer and a light transmitting through the embedded layer and reflected on the surface of the dummy layer.

Further, above objects are achieved by a fabrication method of a thin film magnetic head comprising a planarization process for polishing and planarizing a surface of a material to be polished wherein the planarization process uses the film thickness measuring method described above. In a fabrication method of a thin film magnetic head of the present invention, the first element formation layer structures a bottom shielding layer of the thin film magnetic head and the second element formation layer structures a top shielding layer of the thin film magnetic head.

Further, in a fabrication method of a thin film magnetic head of the present invention, the transparent insulating material is used as a predetermined embedding material. Further, the insulating material is alumina.

Further, above objects are achieved by a polishing method for polishing the surface of a material to be polished to planarize the material at a predetermined film thickness comprising the step of using the method of measuring a film thickness described above when measuring the predetermined film thickness.

Furthermore, above objects are achieved by a substrate for forming a plurality of elements structuring the thin film magnetic head comprises a dummy layer which is formed for being used in the method of measuring a film thickness described above.

BRIEF DESCRIPTION OF THE DRAWINGS

The present invention is further described in connection with the accompanying drawings, in which.

DESCRIPTION OF THE PREFERRED EMBODIMENT

Figure 1:
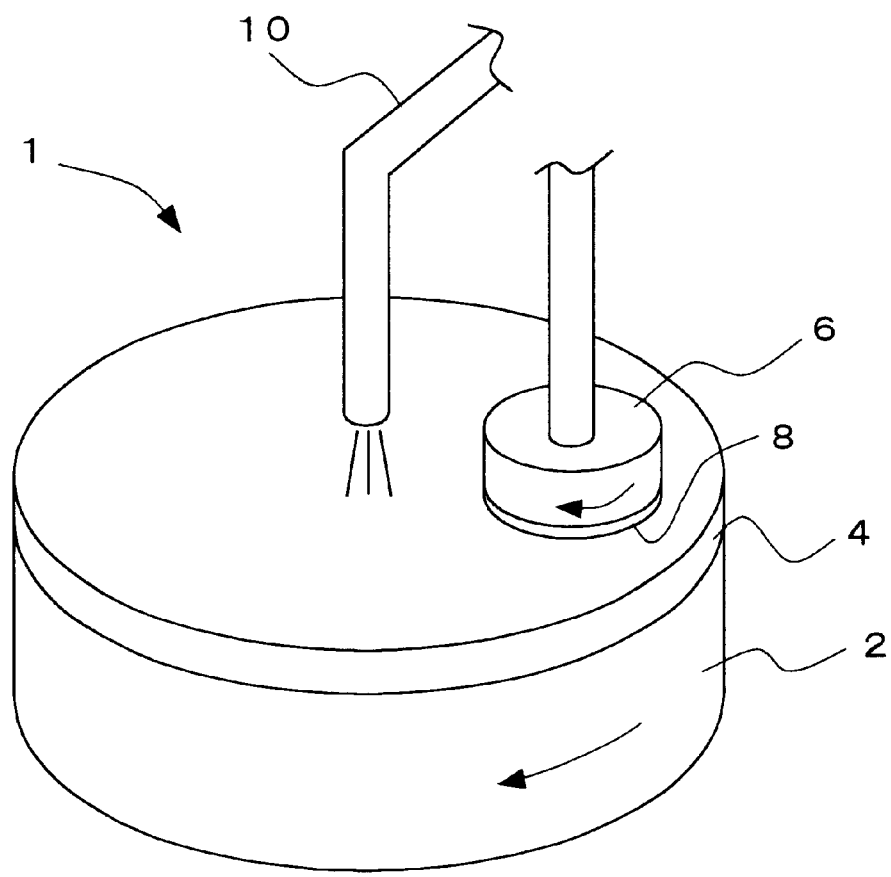
FIG. 1 is a diagram describing a schematic structure of a CMP equipment used in an embodiment of the present invention.

A measuring method of a film thickness and a fabrication method of a thin film magnetic head according to an embodiment of the present invention are described with reference to FIG. 1 through FIG. 9. First, a schematic basic structure of a chemical mechanical polishing equipment (hereinafter, referred to as a CMP equipment), which is used in the measuring method of the film thickness and the fabrication method of the thin film magnetic head according to this embodiment, is described with reference to FIG. 1. FIG. 1 shows the CMP equipment having a conventional general structure. FIG. 1 also shows a state performing a planarization polishing using the CMP by contacting with pressure a surface of a substrate 8 which is a material to be polished to a polishing pad. Further, in this embodiment, various CMP equipments used in the past can be used. In FIG. 1, the CMP equipment 1 has a rotating polishing surface plate (platen) 2. A polishing pad (a polishing cloth) 4 covers a whole upper surface of the polishing surface plate 2. The polishing pad 4 can be rotated by rotating the polishing surface plate 2 by using a rotational mechanism which is not illustrated.

The substrate 8 is held on a polishing head 6 to be able to rotate and a surface of the substrate 8 which is a surface to be polished is contacted with pressure to a polishing surface of the rotating polishing pad 4. Further, a supply opening of a slurry supply pipe 10 supplying slurry (an abrasive material) is located above the polishing surface of the polishing pad 4.

In order to polish the surface of the substrate 8 by the CMP equipment 1 having such a structure, the surface of the substrate 8 is first held on the polishing head 6 so that the surface of the substrate 8 as a material to be polished corresponds to the polishing pad 4 side. Then, the polishing surface of the polishing pad 4 and the surface of the substrate 8 are contacted with pressure to each other so that a predetermined pressure (for example, 400 g/cm$^2$) is produced between both of them. Next, the polishing pad 4 and the surface of the substrate 8 are contacted with pressure and rotated by rotating the polishing surface plate 2 and the polishing head 6 respectively, while supplying the slurry from the slurry supply pipe 10 to the polishing surface of the polishing pad 4.

The slurry supplied from the slurry supply pipe 10 to the polishing pad 4 is diffused on the polishing surface of the polishing pad 4 and is supplied between the polishing pad 4 and the surface of the substrate 8 accompanying the relative movement between the surfaces of the substrate 8 and the polishing pad 4. When the slurry enters between the polishing pad 4 and the surface of the substrate 8 and the polishing pad 4 and the surface of the substrate 8 rub to each other via the slurry, the surface of the substrate 8 is chemically and mechanically polished by the slurry, thereby performing a planarization.

Figure 2:
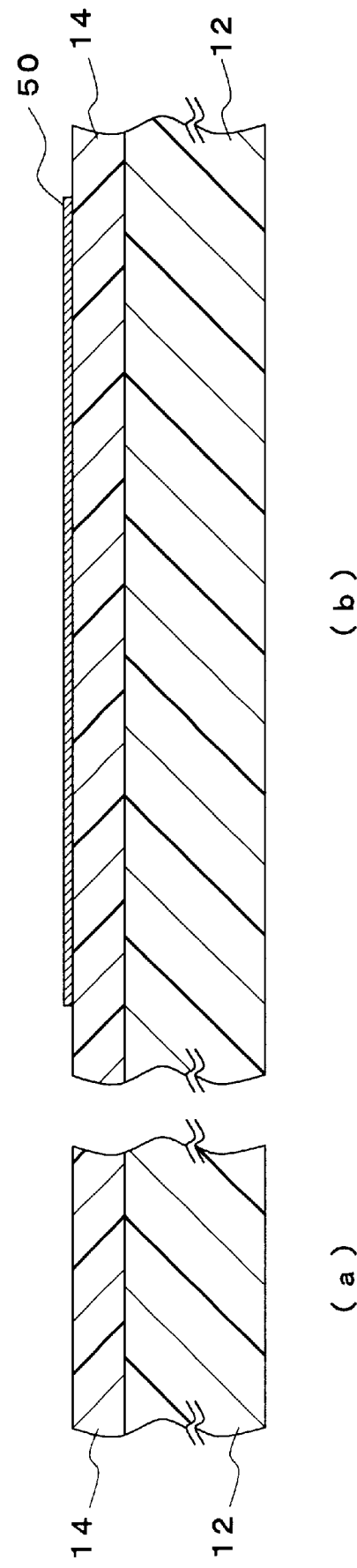
FIG. 2 is a cross sectional view of a substrate for describing a film thickness measuring method according to an embodiment of the present invention and a fabrication method of a thin film magnetic head using the aforementioned measuring method.

Next, the fabrication method of the thin film magnetic head using the measuring method of the film thickness according to this embodiment is described with reference to FIG. 2 through FIG. 9. In this embodiment, a combination type head formed by laminating an inductive thin film magnetic head for writing and a MR reading element for reading is described as an example. In the following description, FIG. 2($a$), FIG. 5($a$), FIG. 7($a$) and FIG. 8($a$) show cross sections of the substrate of a magnetic portion of the thin film magnetic head cut in parallel with a truck plane of the recording media of the magnetic recording device. FIG. 2($b$), FIG. 5($b$), FIG. 7($b$) and FIG. 8($b$) show cross sections of the substrate of an area forming a dummy layer for the film thickness measurement according to this embodiment.

First, as shown in FIGS. 2($a$), ($b$), an insulating layer 14 as a lower layer made of, for example, alumina ($Al_2O_3$) is deposited to several micrometers in thickness on a substrate 12 made of, for example, AlTiC.

Next, a bottom shielding layer which is an element formation layer structuring a part of the thin film magnetic head (element) is formed. However, prior to that, in this embodiment as shown in FIG. 2($b$), at least one dummy layer 50 for measuring a film thickness, which has a predetermined film thickness thinner than the bottom shielding layer and does not contribute to an element structure of the thin film magnetic head, is formed on the substrate 12. The dummy layer 50 can be simultaneously formed with an alignment mark when the alignment mark for alignment used in a photolithography process to form each element formation layer on the substrate 12 is formed. The alignment mark is generally formed by a metal material which reflects a light on its surface so that the alignment mark can be read by an alignment optical system of a projection aligner in the photolithography process. Therefore, the dummy layer 50 simultaneously formed has a surface which can reflect the light. It will be noted that, the dummy layer 50 can be of course formed by other processes different from the alignment process, for example, such as a spattering.

While a film thickness of the bottom shielding layer to be next formed is equal to approximately 3 μm, the thickness of the dummy layer 50 is formed to a previously defined predetermined film thickness within the range of several nanometers or several hundred nanometers at the most, which is extremely thinner than the thickness of the bottom shielding layer.

Figure 3:
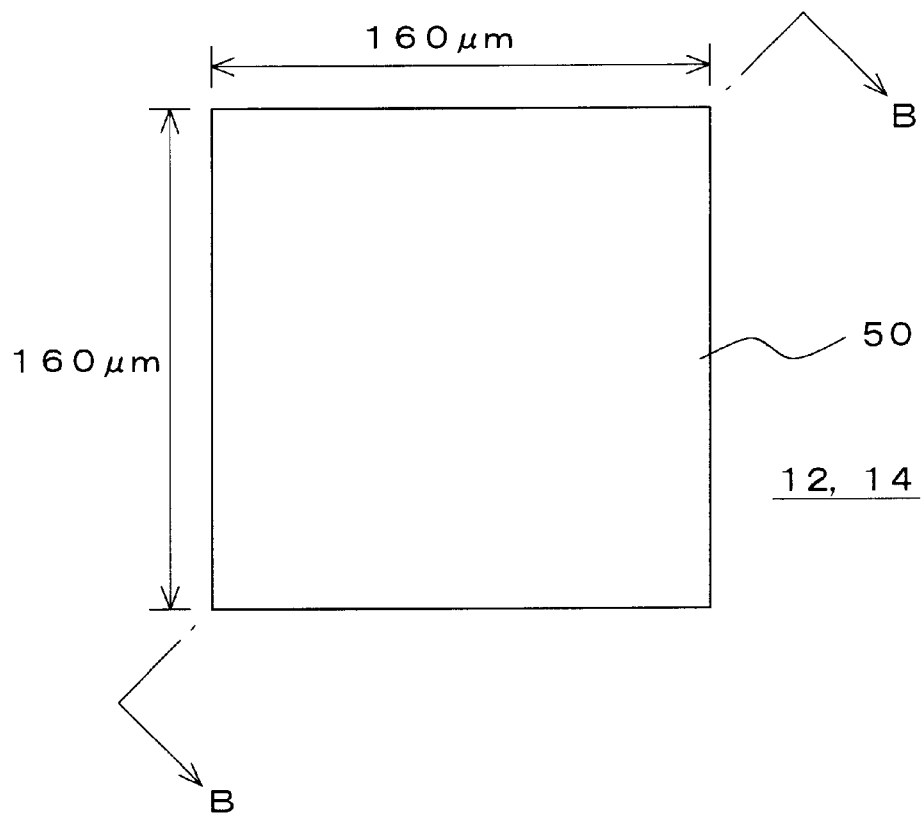
FIG. 3 is a plan view of a substrate for describing a film thickness measuring method according to an embodiment of the present invention and a fabrication method of a thin film magnetic head using the aforementioned measuring method.
Figure 4:
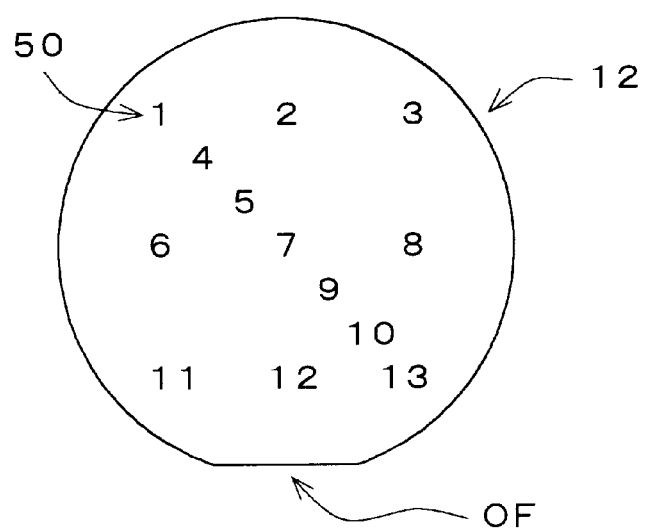
FIG. 4 is a diagram showing a substrate for forming a thin film magnetic head in a film thickness measuring method according to an embodiment of the present invention and a fabrication method of a thin film magnetic head using the aforementioned measuring method.
Figure 5:
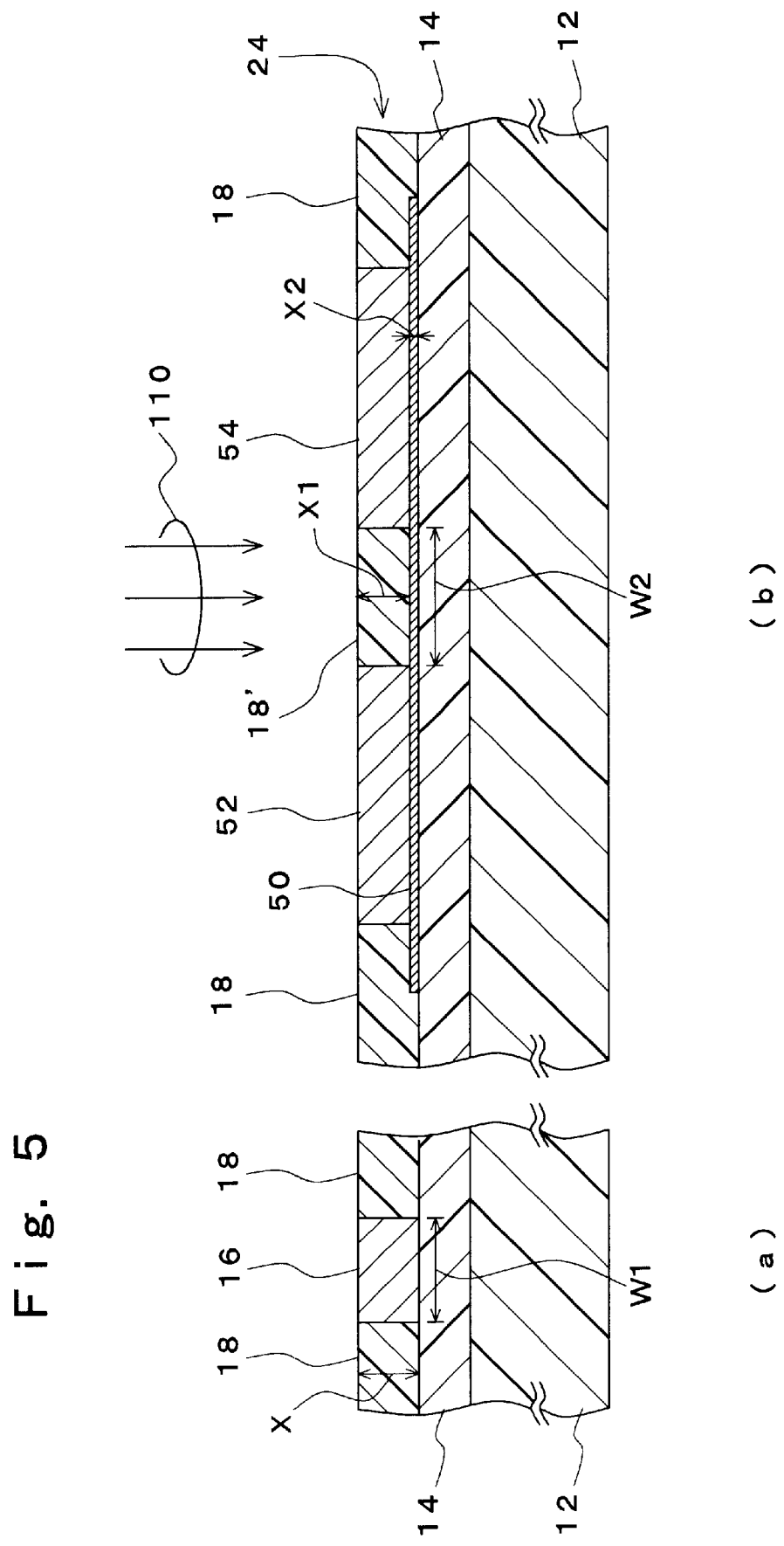
FIG. 5 is a cross sectional view of a substrate for describing a film thickness measuring method according to an embodiment of the present invention and a fabrication method of a thin film magnetic head using the aforementioned measuring method.

FIG. 3 shows a shape of the dummy layer 50 viewed from the top of the substrate 12. In this embodiment, the dummy layer 50 is formed in a shape of a square which is 160 μm in vertical and horizontal lengths. It will be noted that FIG. 2(b) shows a state cut by a cross section B—B in FIG. 3. FIG. 4 shows a state when the substrate 12 is observed from its top. As shown in FIG. 4, the substrate 12 used in this embodiment has a plate shape, for example, having a circular circumference which is equal to 3 inches in diameter and has an orientation flat (OF) in which a part of the circumference is cut linearly. The OF is used for a rough alignment when placing the transferred substrate 12 on a stage of the aligner or the like. On the surface of the substrate 12, thirteen dummy layers 50, shown in FIG. 3, are formed. FIG. 4 shows locations, where these dummy layers 50 are formed, by consecutive numbers (1–13). These dummy layers 50 are formed, while avoiding an element area of the thin film magnetic head, at a total of thirteen points of four vertexes of a square formed by two sides substantially parallel to and two sides substantially perpendicular to the OF, middle points of those four sides and five points on one diagonal line. Thus, a substrate for forming a thin film magnetic head which forms a plurality of the elements to structure a thin film magnetic head as well as forming a thin film magnetic head on which the dummy layers 50 used in the measuring method of the film thickness according to this embodiment described later is formed. It will be noted that, in this embodiment, FIG. 4 is shown as an example and the dummy layers 50 may surely be in other arrangement shape or numbers. Moreover, a single dummy layer 50 may also be formed on the surface of the substrate 12.

Next, as shown in FIGS. 5(a), (b), for example, after forming a permalloy layer to approximately 3 μm in thickness on a whole surface, a bottom shielding layer 16 which is an element formation layer is formed by patterning. The pattern width W1 of the bottom shielding layer 16 of the portion shown in FIG. 5(a) is approximately equal to 100 μm. The bottom shielding layer 16 functions as a magnetic shield to protect the MR reading element of a reading head, which is to be formed hereafter, from an influence of an external magnet field.

In the process of forming this bottom shielding layer 16, two dummy layers 52 and 54 for measuring a film thickness, which do not contribute to the element structure, are formed on the dummy layer 50. In this embodiment, these two dummy layers 52 and 54 are simultaneously formed by the same deposition process as the bottom shielding layer 16. However, the dummy layers 52 and 54 can also be formed by a different process from the forming process of the bottom shielding layer 16.

Figure 6:
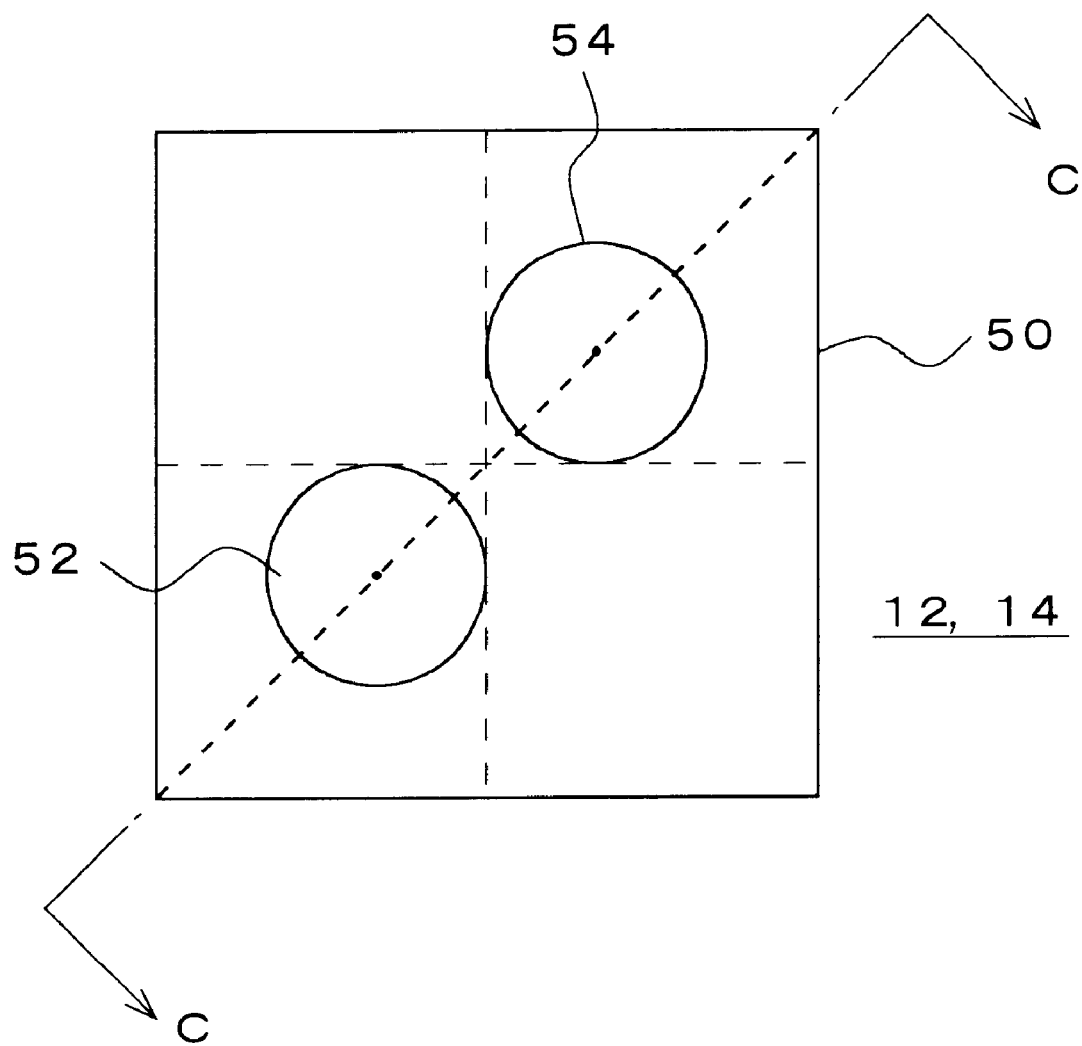
FIG. 6 is a plan view of a substrate for describing a film thickness measuring method according to an embodiment of the present invention and a fabrication method of a thin film magnetic head using the aforementioned measuring method.

FIG. 6 shows a shape of the dummy layer 50 viewed from the top of the substrate 12 and a shape of the two dummy layers 52 and 54 formed on the dummy layer 50. The two dummy layers 52 and 54 according in this embodiment have their centers on a diagonal line of the dummy layer 50 having a shape square and are patterned cylindrically with a diameter equals to 60 μm. Therefore, the upper surfaces of the dummy layers 52 and 54 are formed larger than areas of the bottom shielding layer 16 and the embedded layer formed at a top shielding layer which is an element formation layer to be formed later. The upper surface has enough areas as well for a spot diameter (20 μm) of a light beam from a film thickness measuring equipment to enter.

Furthermore, the two dummy layers 52 and 54 have a physical relationship in which two hypothetical lines connecting middle points of facing sides of the square of the dummy layer 50 contact side walls of the cylindrical dummy layers 52 and 54. It will be noted that FIG. 5(b) shows a state cut by a diagonal line of the square (C—C cross sectional line in the diagram) of the dummy layer 50 in FIG. 6. Therefore, space W2 between the dummy layers 52 and 54 in FIG. 5(b) is approximately equal to 28 μm.

In this embodiment, the two dummy layers 52 and 54 are formed because the number of dummy layers is corresponded to the number of layers the film thickness of which is measured in order to respectively measure the film thickness of two layers to be formed sequentially, which are a top shielding layer and a pole tip structuring a top pole. In the following description, a layer where these two dummy layers 52 and 54 are formed is referred to a reference layer for measuring a film thickness as an occasion arises.

Next, in order to planarize the upper surface of the bottom shielding layer 16, a coated layer is formed by depositing alumina on the whole surface of the substrate, and the bottom shielding layer 16 and the dummy layers 52 and 54 are embedded and coated. Then, a planarization process is performed according to the CMP using the CMP equipment shown in FIG. 1 and the upper surface of the substrate 12 is planarized. In planarization according to the CMP, as shown in FIGS. 5(a), (b), polishing is performed until the surface of the bottom shielding layer 16 and the surfaces of the dummy layers 52 and 54 expose. Ultimately, a planarized layer 24, structured by the bottom shielding layer 16, the dummy layers 52 and 54 and embedded layers 18 and 18', is formed. A desired film thickness of the bottom shielding layer 16 in a state when this planarized layer 24 is formed is equal to 2 μm.

After the bottom shielding layer 16 is formed in this manner, a film thickness of the formed bottom shielding layer 16 is measured. In case of this film thickness measurement, the similar non-contact optical film thickness measuring equipment to the conventional one can be used. First, a light beam formed by setting down the spot diameter 110 of the non-contact optical film thickness measuring equipment to approximately 20 μm is irradiated to the embedded layer 18'. As a principle, the light beam may be irradiated anywhere as long as on the embedded layers 18 and 18' on the dummy layer 50. In this embodiment as shown in FIG. 5(b) and FIG. 6, the light beam is irradiated on the embedded layer 18' on the dummy layer 50 sandwiched between the two dummy layers 52 and 54.

A part of the light beam is reflected on the surface of the embedded layer 18' made of alumina and the rest of the light beam is transmitted through transparent alumina and reflected on the surface of the dummy layer 50. The film thickness measuring equipment measures a film thickness of the embedded layer 18' by receiving these two reflected lights and making both lights interfere. Since a lower layer of the bottom shielding layer 16 is planarized and the surfaces of the bottom shielding layer 16, the dummy layers 52 and 54 and the embedded layers 18 and 18' are planarized by the CMP, the film thickness of the bottom shielding layer 16 can be accurately obtained by the measured film thickness of the embedded layer 18'. In short, as shown in FIGS. 5(a), (b), the film thickness X of the bottom shielding layer 16 can be obtained by adding the film thickness X2 of the dummy layer 50 previously formed at a predetermined film thickness to the measured film thickness X1 of the embedded layer 18. It will be noted that since the film thickness of the dummy layer 50 is extremely shin in comparison with the film thickness of the bottom shielding layer 16, the measured film thickness X1 of the embedded layer 18' measured by neglecting the film thickness of the dummy layer 50 may be the film thickness X of the bottom shielding layer 16.

The film thickness measurement of the embedded layer 18' described above is performed respectively at all of the thirteen points, shown in FIG. 4, on the dummy layer 50 and then an average of those measured values may be used as the film thickness of the bottom shielding layer 16, or data taken at a plurality of predetermined points among the thirteen points may be used. The point is that a film thickness can be determined unrestrictedly depending on a balance between measurement accuracy and measurement time.

Thus, according to the film thickness measurement in this embodiment, a film thickness measurement within a fine element area can be performed without irradiating a light beam of a non-contact optical film thickness measuring equipment to a surface being formed within the fine element area. Therefore, even when miniaturization and complication of each element structuring a thin film magnetic head progress, by using the conventional non-contact optical film thickness measuring equipment, it is possible to extremely accurately measure a film thickness of a desired element formation layer.

In the meantime, after completing the film thickness measurement of the formed bottom shielding layer 16, as shown in FIGS. 7(a), (b), an insulating layer 26 is formed by depositing alumina to a predetermined thickness on the planarized layer 24 by spattering. Next, a material having a magnetoresistive effect and structuring a MR reading element is deposited and patterned, thereby forming a magnetoresistive layer 28. At this time, on the upper position of the dummy layer 52 among the dummy layers 52 and 54 formed on the reference layer, a layer is formed on the insulating layer 26 by the same process as the magnetoresistive layer 28 and patterned, thereby forming a dummy layer 56.

Next, an insulating layer 30 is formed and the magnetoresistive layer 28 is embedded between the insulating layers 26 and 30. Then, a top shielding layer 32 made of permalloy (an alloy of Ni and Fe) is formed to approximately 4.5 $\mu$m in thickness. This top shielding layer 32 along with the bottom shielding layer 16 has a function to magnetically shield the MR reading element.

When forming this top shielding layer 32, a dummy layer 58 for measuring a film thickness, which does not contribute to the element structure, is formed on the insulating layer 30 on the dummy layer 52 among the dummy layers 52 and 54 formed on the reference layer. In this embodiment, this dummy layer 58 is simultaneously formed in the same film forming process as the top shielding layer 32. However, the dummy layer 58 can be formed by a different process from the forming process of the top shielding layer 32.

Figure 7:
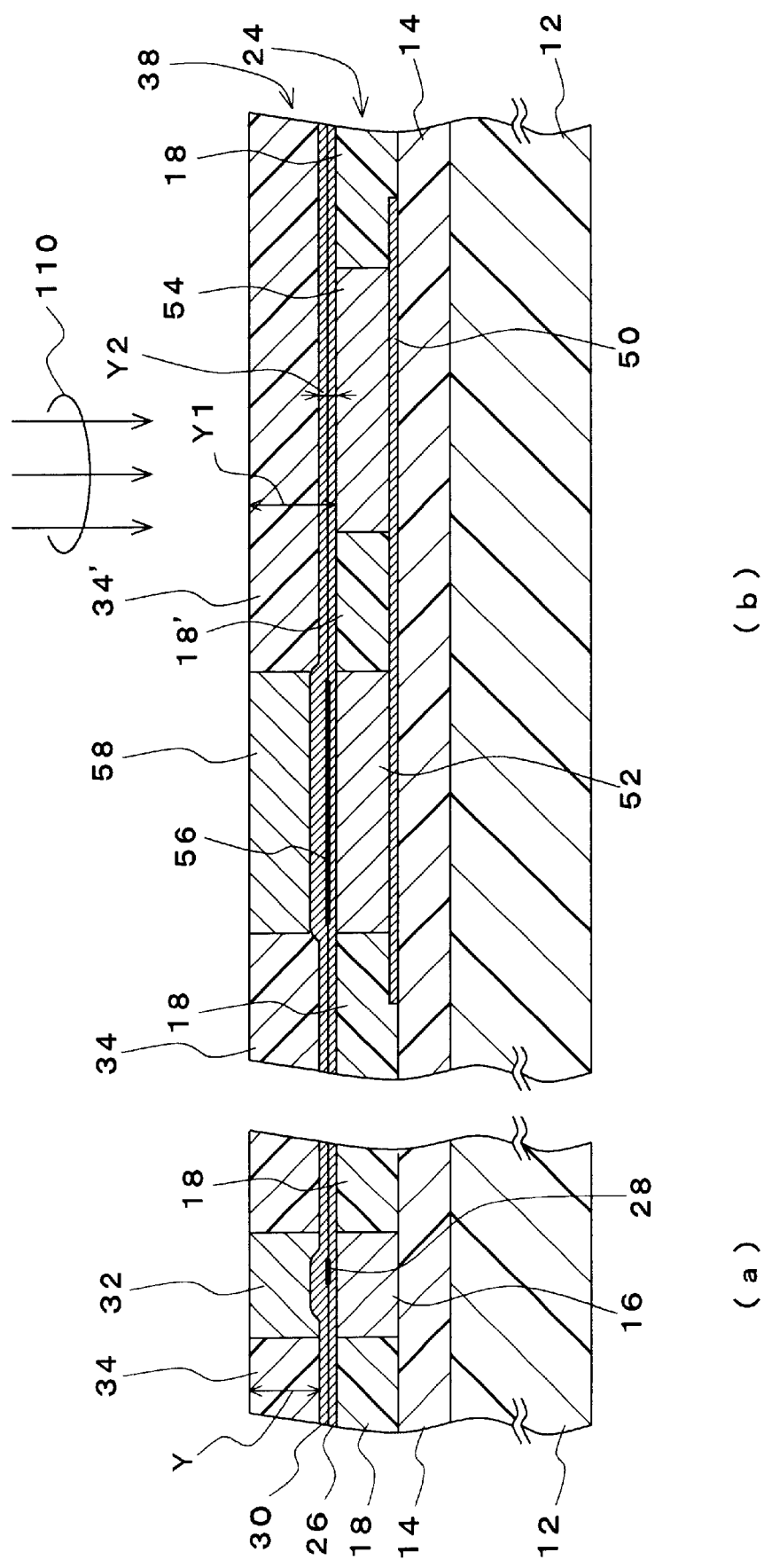
FIG. 7 is a cross sectional view of a substrate for describing a film thickness measuring method according to an embodiment of the present invention and a fabrication method of a thin film magnetic head using the aforementioned measuring method.

Next, in order to planarize an upper surface of the top shielding layer 32, a coated layer is formed by depositing alumina on the whole surface of the substrate and the top shielding layer 32 and the dummy layer 58 are embedded and coated. Then, the CMP is performed by the CMP equipment shown in FIG. 1 and the upper surface of the substrate 12 is planarized. In the planarization by the CMP, as shown in FIG. 7, polishing is performed until the top shielding layer 32 exposes. Ultimately, a planarized layer 38, which is structured by the top shielding layer 32, the dummy layer 58 and embedded layers 34 and 34' formed by the residual films of the coated layer, is formed. A desired film thickness of the top shielding layer 32 in a state when this planarized layer 38 is formed is equal to 3.5 $\mu$m.

When the top shielding layer 32 is formed in this manner, a film thickness of the formed shielding layer 32 is measured. This film thickness measurement can also use a similar non-contact optical film thickness measuring equipment to the conventional one. First, a light beam formed by setting down the spot diameter 110 of the non-contact optical film thickness measuring equipment to approximately 20 $\mu$m is irradiated toward a surface of the dummy layer 54 below the embedded layer 34'.

A part of the light beam is reflected on a surface of the embedded layer 34' made of alumina and the rest of the light is transmitted through transparent alumina and reflected on a surface of the dummy layer 54. The film thickness measuring equipment measures an overall thickness including the film thickness of the embedded layer 34' and insulating layers 26 and 30 by receiving these two reflected lights and making the both lights interfere. Since the lower layer of the top shielding layer 32 is planarized and the surfaces of the top shielding layer 32, the dummy layer 58 and embedded layers 34 and 34' are planarized by the CMP, the film thickness of the top shielding layer 32 can be accurately obtained from the film thicknesses of the measured embedded layer 34' and insulating layers 26 and 30. In short, as shown in FIGS. 7(a), (b), the film thickness Y of the top shielding layer 32 can be obtained by subtracting the film thickness Y2 of the insulating layers 26 and 30 previously formed to a predetermined film thickness from the film thickness Y1 of the measured embedded layer 34' and the insulating layers 26 and 30.

Further, the film thickness measurement of the embedded layer 34' described above may be performed respectively at all of the thirteen points, shown in FIG. 4, on the dummy layer 54 on the dummy layer 50 and then an average of those measured values may be used as the film thickness of the top shielding layer 32, or data taken at a plurality of predetermined points among the thirteen points may be used. The point is that a film thickness can be determined unrestrictedly depending on a balance between measurement accuracy and measurement time.

Thus, according to the film thickness measurement in this embodiment, a film thickness measurement of the top shielding layer 32 can be performed without irradiating the light beam of the con-contact optical film thickness measuring equipment to a fine embedded layer within a range of elements of the top shielding layer 32. Therefore, even when the top shielding layer 32 structuring a thin film magnetic head is fined, by using the conventional non-contact optical film thickness measuring equipment, it is possible to extremely accurately measure a film thickness.

After completing the formation of a planarized layer 38 at a top shielding layer (bottom pole) 32, as shown in FIGS. 8(a), (b), a write gap layer 40 is formed by depositing a non-magnetic material made of, for example, alumina on the planarized layer 38. In this process, at least, a dummy layer 60 made of alumina, which has the same film thickness as the write gap layer 40, is formed. After that, a pole tip 42 which structures a part of a top pole and made of materials with high saturation magnetic flux density such as, for example, permalloy and iron nitride (FeN) is formed to approximately 5 μm in thickness. A track width is defined by a width of the pole tip 42 formed in predetermined shape.

Figure 8:
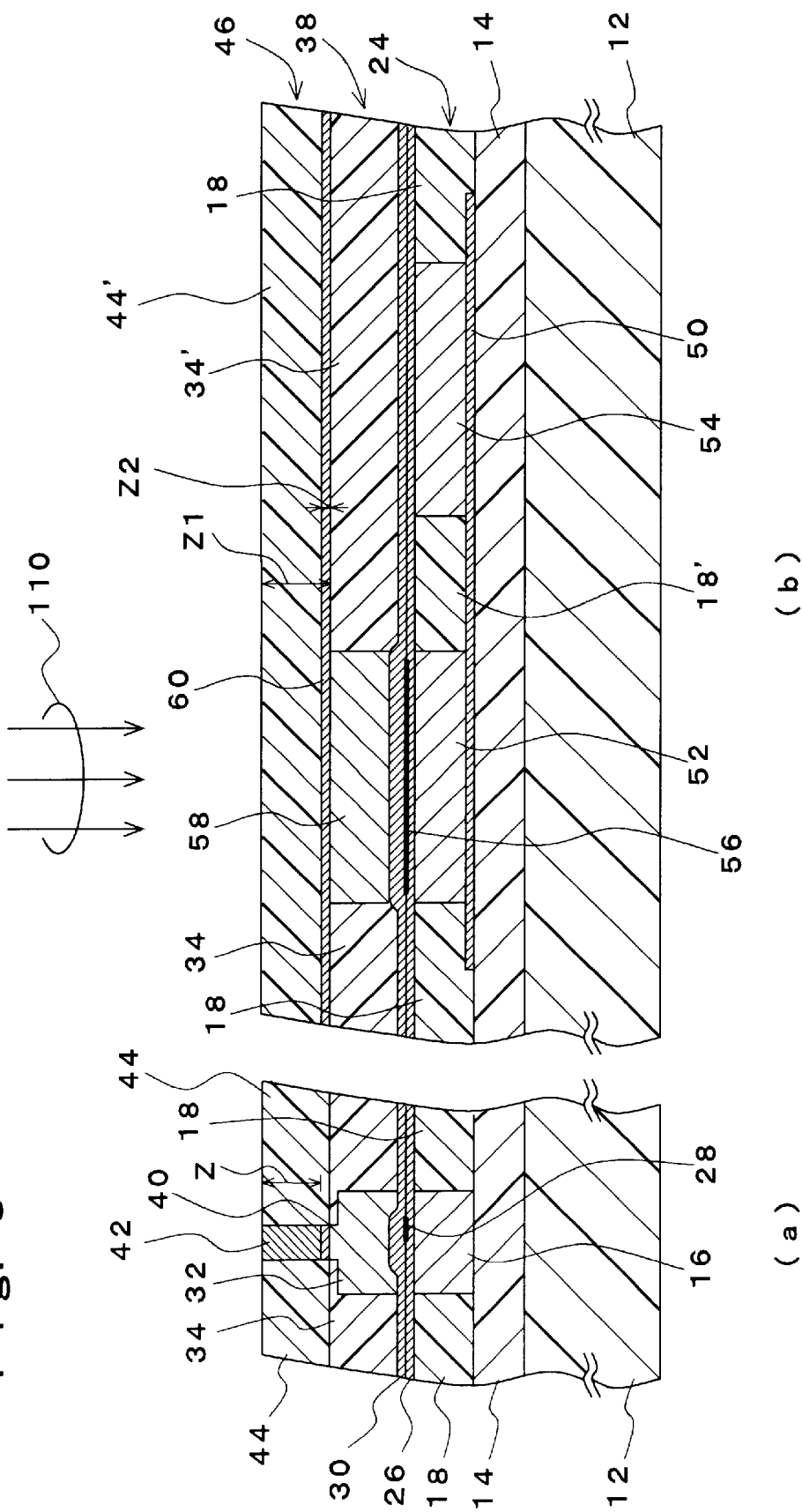
FIG. 8 is a cross sectional view of a substrate for describing a film thickness measuring method according to an embodiment of the present invention and a fabrication method of a thin film magnetic head using the aforementioned measuring method.

Next, in order to planarize an upper surface of the pole tip 42, the whole surface of the substrate is deposited by alumina and coated by forming a coating layer thicker than the pole tip 42 and embedding the pole tip 42. Then, the CMP by the CMP equipment shown in FIG. 1 is performed and the upper surface of the substrate 12 is planarized. In the planarization by the CMP, as shown in FIG. 8(*a*), polishing is performed until the pole tip 42 exposes and ultimately a planarized layer 46, structured by the embedded layers 44 and 44' and the pole tip 42, is formed. A desired film thickness of the pole tip 42 at this time is equal to approximately 4 μm.

When the pole tip 42 is formed in this manner, a film thickness of the formed pole tip 42 is measured. This film thickness measurement can also use a similar non-contact optical film thickness measuring equipment to the conventional. First, the spot diameter 110 of the non-contact optical film thickness measuring equipment is set down to approximately 20 μm and a light beam is irradiated toward a surface of the dummy layer 58 below the embedded layer 44'.

A part of the light beam is reflected on a surface of the embedded layer 44' made of alumina and the rest of the light is transmitted through transparent alumina and reflected on a surface of the dummy layer 58. By receiving these two reflected lights and making the both lights interfere, an overall thickness including the thickness of the embedded layer 44' and the dummy layer 60 which has the same level of film thickness as the write gap layer 40 can be measured. Since a lower layer of the pole tip 42 is planarized and the surfaces of the pole tip 42 and the embedded layers 44 and 44' are planarized by the CMP, a film thickness of the pole tip 42 can be accurately obtained from the film thickness of the measured embedded layer 44' and the dummy layer 60. In short, as shown in FIGS. 8(*a*), (*b*), the film thickness Z of the pole tip 42 can be obtained by subtracting the film thickness Z2 of the dummy layer 60 previously formed to a predetermined film thickness from the film thickness Z1 of the measured embedded layer 44' and the dummy layer 60.

It will be noted that the film measurement of the embedded layer 44' and the dummy layer 60 described above is performed respectively, shown in FIG. 4, to all the dummy layers 58 on the dummy layers 50 at all of the thirteen points and then an average of those measured values may be used as the film thickness of the pole tip 42, or data taken at a plurality of predetermined points among the thirteen points may be used. The point is that a film thickness can be determined unrestrictedly depending on a balance between measurement accuracy and measurement time.

Thus, according to the film thickness measurement in this embodiment, a film thickness measurement of the pole tip 42 can be performed without irradiating a light beam of the non-contact optical film thickness measuring equipment to a fine embedded layer within a element area of the pole tip 42. Therefore, even when the pole tip 42 structuring a thin film magnetic head is fined, it is possible to extremely accurately measure a film thickness by using the conventional non-contact optical film thickness measuring equipment.

In the meantime, after completing a formation of a planarized layer 46 at the pole tip 42, although an illustration is omitted, the first thin film coil made of, for example, copper is formed. After the first insulating film is formed on the first thin film coil, the second thin film coil is formed. Then, the second insulating film is formed on the second thin film coil.

Figure 9:
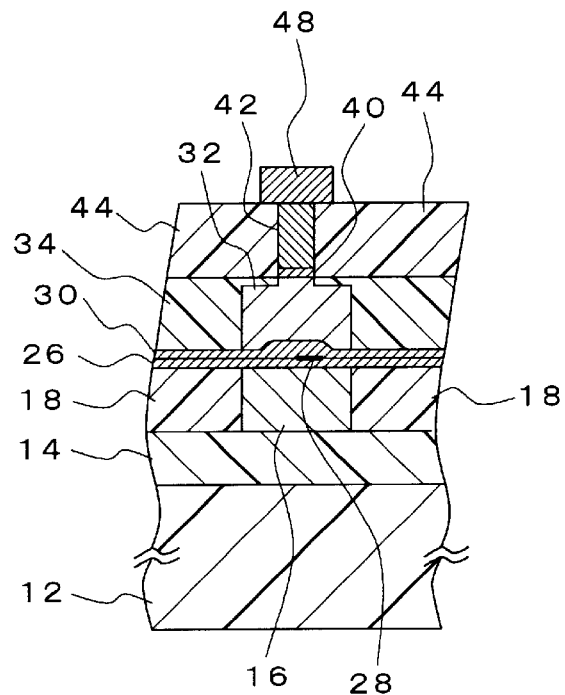
FIG. 9 is a cross sectional view of a substrate for describing a measuring method of a film thickness according to an embodiment of the present invention and a fabrication method of a thin film magnetic head using the aforementioned measuring method.
Figure 10:
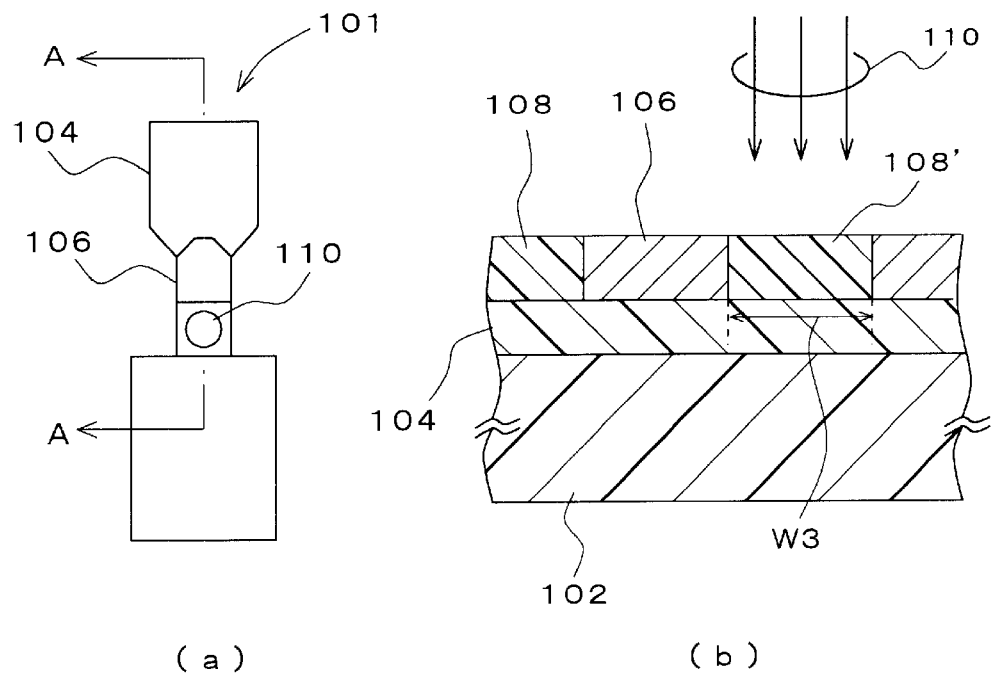
FIG. 10 is a diagram describing the conventional film thickness measuring method.

Next, as shown in FIG. 9, on the pole tip 42 and the second insulating film an illustration of which is omitted, a yoke 48 made of, for example, permalloy is formed to a predetermined film thickness and in a predetermined shape. Then, after an overcoating layer of alumina and the like is deposited on the substrate, side walls adjacent to the magnetoresistive layer 28 and the write gap layer 40 are polished and an Air Bearing Surface (ABS) facing a magnetic recording medium is formed, thereby completing a fabrication of main structural elements for the thin film magnetic head.

At this stage, as previously shown in FIG. 4, the thirteen dummy layers 50 are formed on the surface of the substrate 12 and the dummy layers 52 and 54 are formed on each of the dummy layers 50. Still more, the dummy layers 56, 58 and 60 are formed thereon, thereby making a substrate for forming a thin film magnetic head.

The present invention enables various deformations, without being limited to the embodiment described above.

In the embodiment described above, the present invention is applied to the film thickness measurement of the bottom shielding layer and top shielding layer of the thin film magnetic head as well as the pole tip structuring the top pole. However, the present invention may of course be applied to either one of these layers and the measuring method of the film thickness according to the present invention can be applied to other layers which structure the thin film magnetic head.

Further, in the embodiment described above, the dummy layers 52, 54 and the like for measuring a film thickness of the top shielding layer 32, the pole tip and the like are formed on the dummy layer 50. However, the present invention can also be applied when the dummy layers 52, 54 and the like are provided in an area other than the dummy layer 50. Furthermore, when a reflection from the lower layer can be obtained, the dummy layer 50 used for measuring the film thickness of the bottom shielding layer 16 is not required to be formed. The dummy layers 52 and 54 may be formed directly on the lower insulating layer 14 at the same time as the formation of the bottom shielding layer 16.

Moreover, in the embodiment described above, though the present invention is applied to the planarization process using polishing according to the CMP, the measuring method of the film thickness according to the present invention can be of course applied to a planarization process by, for example, a mechanical polishing and the like without being limited to aforementioned process.

Furthermore, in the embodiment described above, though an example of the fabrication method of the thin film magnetic head is used for description, the measuring method of the film thickness according to the present invention is not limited to aforementioned method and can also be applied to a film thickness measurement in a fabrication method of, for example, a semiconductor fabrication equipment.

As described above, according to the present invention, the residual film thickness of a object film for polishing in the polishing process can be measured at high accurately. Further, according to the present invention, even if the measurement area of the residual film thickness of the object film for polishing in the polishing process is fined, a film thickness can be measured at a high accuracy.

Furthermore, according to the present invention, since the residual film thickness of the object film for polishing in the polishing process can be measured at a high accuracy, a fabrication method of a thin film magnetic head, in which a yield of fabricated elements is improved, can be realized.

What is claimed is:

1. A method of measuring a film thickness comprising the steps of:

forming, on the substrate, an element formation layer structuring a portion of an element and at least one dummy layer for a film thickness measurement which has a predetermined film thickness thinner than the element formation film and does not contribute to the structure of the element;

forming a planarized layer planarized by polishing a surface until the surface of the element formation layer exposes from a embedded layer, after embedding and coating the element formation layer and the dummy layer with a predetermined embedding material;

measuring a film thickness of the embedded layer over the dummy layer; and measuring a film thickness of the element formation layer based on the film thickness of the embedded layer.

2. A method as set forth in claim 1, wherein the dummy layer is simultaneously formed with an alignment mark for an alignment on the substrate when the alignment mark is formed.

3. A method as set forth in claim 1, wherein the dummy layer is made of a material which reflects light on the surface thereof.

4. A method as set forth in claim 3, wherein the material is metal.

5. A method of measuring a film thickness comprising the steps of:

forming, on a surface, a first element formation layer structuring a portion of an element and at least one dummy layer which does not contributes to the structure of the element;

forming a first planarized layer planarized by polishing a surface until a surface of the first element formation layer and the surface of the dummy layer expose after embedding and coating the first element formation layer and the dummy layer;

forming a second element formation layer structuring a portion of the element on the first planarized layer;

forming a second planarized layer planarized by polishing a surface until the surface of the second element formation layer exposes from the embedded layer after embedding and coating the second element formation layer with a predetermined embedding material;

measuring a film thickness of the embedded layer on the dummy layer; and measuring a film thickness of the second element formation layer based on the film thickness of the embedded layer.

6. A method as set forth in claim 5, wherein the first element formation layer and the dummy layer are simultaneously formed in the same process.

7. A method as set forth in claim 5, wherein a plurality of the dummy layers are provided on a reference layer of a film thickness measurement according to the number of layers the thickness of which are measured.

8. A method as set forth in claim 5, wherein at least one second dummy layer is formed when the second element formation layer is formed.

9. A method as set forth in claim 8, wherein the second element formation layer and the second dummy layer are simultaneously formed in the same process.

10. A method as set forth in claim 8, wherein the second dummy layer is laminated over the dummy layer of the first planarized layer.

11. A method as set forth in claim 1, wherein the planarized layer is formed by polishing a surface using a chemical mechanical polishing.

12. A method as set forth in claim 1, wherein an area of the upper surface of the dummy layer is formed to be larger than one portion of an area of the element structured at the element formation layer.

13. A method as set forth in claim 1, wherein the film thickness of the embedded layer is measured based on interference between a light reflected on the surface of the embedded layer when inputting a light to the embedded layer and a light transmitting through the embedded layer and reflected on the surface of the dummy layer.

14. A fabrication method of a thin film magnetic head comprising a planarization process for polishing and planarizing a surface of a material to be polished wherein the planarization process uses the film thickness measuring method as set forth in claim 5.

15. A fabrication method of a thin film magnetic head as set forth in claim 14, wherein the first element formation layer structures a bottom shielding layer of the thin film magnetic head and the second element formation layer structures a top shielding layer of the thin film magnetic head.

16. A fabrication method of a thin film magnetic head as set forth in claim 14, wherein the transparent insulating material is used as a predetermined embedding material.

17. A fabrication method of a thin film magnetic head as set forth in claim 16, wherein the insulating material is alumina.

18. A polishing method for polishing the surface of a material to be polished to planarize the material at a predetermined film thickness comprising the step of:

using the method of measuring a film thickness as set forth in claim 1 when measuring the predetermined film thickness.

* * * * *